United States Patent
Kim et al.

(10) Patent No.: US 11,135,622 B2
(45) Date of Patent: Oct. 5, 2021

(54) DEVICE FOR CLEANING SURFACE USING ELECTROWETTING ELEMENT AND METHOD FOR CONTROLLING THE SAME

(71) Applicant: LG ELECTRONICS INC., Seoul (KR)

(72) Inventors: Wonsu Kim, Seoul (KR); Sungdu Kwon, Seoul (KR); Salkmann Ji, Seoul (KR); Samnyol Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 264 days.

(21) Appl. No.: 15/920,215

(22) Filed: Mar. 13, 2018

(65) Prior Publication Data

US 2018/0264526 A1    Sep. 20, 2018

Related U.S. Application Data

(60) Provisional application No. 62/470,883, filed on Mar. 14, 2017.

(30) Foreign Application Priority Data

Jan. 11, 2018    (KR) ................. 10-2018-0003684

(51) Int. Cl.
*B08B 3/12*    (2006.01)
*B08B 3/10*    (2006.01)
(Continued)

(52) U.S. Cl.
CPC .......... *B08B 3/12* (2013.01); *B01L 3/502792* (2013.01); *B08B 3/10* (2013.01);
(Continued)

(58) Field of Classification Search
CPC .. B08B 3/12; B08B 3/10; B08B 17/02; G02B 27/0006; G06T 7/20; G01H 9/00;
(Continued)

(56) References Cited

U.S. PATENT DOCUMENTS 5,531,862 A * 7/1996 Otsubo ................. C23C 14/564
                                                          438/798
8,940,147 B1 * 1/2015 Bartsch ............ G01N 27/44791
                                                          204/601

(Continued)

FOREIGN PATENT DOCUMENTS

GB    2518136 A    3/2015
JP    6-1205 A    1/1994
(Continued)

OTHER PUBLICATIONS

Why Use Parylene?, Parylene Engineering (2019) (Year: 2019).*
(Continued)

*Primary Examiner* — Maris R Kessel
*Assistant Examiner* — Vivian A Tran
(74) *Attorney, Agent, or Firm* — Birch, Stewart, Kolasch & Birch, LLP

(57) ABSTRACT

A device for cleaning an object surface, including a substrate provided on the object surface, a plurality of electrodes provided on the substrate, a dielectric layer provided on the substrate to cover the electrodes, and a control device supplying an alternating-current (AC) power to the electrodes including supplying a first AC power having a predetermined first frequency and a predetermined first voltage to the electrodes during a first time period to vibrate a droplet on the surface of the object by a periodic change of an electrostatic force generated at the electrodes, the first frequency being set to the resonant frequency of the liquid droplet.

16 Claims, 8 Drawing Sheets

(51) Int. Cl.
*G02B 27/00* (2006.01)
*G01H 13/00* (2006.01)
*B01L 3/00* (2006.01)
*B08B 17/02* (2006.01)
*G06T 7/20* (2017.01)

(52) U.S. Cl.
CPC .......... *B08B 17/02* (2013.01); *G02B 27/0006* (2013.01); *G06T 7/20* (2013.01); *B01L 2400/0427* (2013.01); *G01H 13/00* (2013.01)

(58) Field of Classification Search
CPC . G01H 13/00; B01L 3/502784–502792; B01L 2400/0427
See application file for complete search history.

(56) References Cited

U.S. PATENT DOCUMENTS

| | | | |
|---|---|---|---|
| 10,525,472 B1* | 1/2020 | Pandey | B01L 3/502792 |
| 2004/0055891 A1 | 3/2004 | Pamula et al. | |
| 2004/0189732 A1* | 9/2004 | Usuda | B41J 2/0456 347/19 |
| 2005/0106323 A1* | 5/2005 | Miura | B32B 37/24 427/346 |
| 2010/0072078 A1* | 3/2010 | Davoust | B01F 11/02 205/687 |
| 2011/0253539 A1* | 10/2011 | Akdim | B03C 3/08 204/555 |
| 2012/0243093 A1* | 9/2012 | Tonar | H01L 41/0973 359/507 |
| 2014/0158213 A1* | 6/2014 | Usui | B08B 17/02 137/13 |
| 2018/0275397 A1* | 9/2018 | Chung | G02B 27/0006 |

FOREIGN PATENT DOCUMENTS

| | | |
|---|---|---|
| JP | 2009-200159 A | 9/2009 |
| JP | 2011-504294 A | 2/2011 |
| JP | 2011-54973 A | 3/2011 |
| JP | 2012-138768 A | 7/2012 |
| KR | 10-2010-0035691 A | 4/2010 |
| WO | WO 2017/099459 A1 | 6/2017 |
| WO | WO 2017/200242 A2 | 11/2017 |

OTHER PUBLICATIONS

Oh et al., Shape Oscillation of a Drop in ac Electrowetting, Langmuir, vol. 24, Issue 15, pp. 8379-8386 (2008) (Year: 2008).*
Indium Tin Oxide (ITO), Knight Optical (2020) (Year: 2020).*
Mannetje et al., Electrically assisted drop sliding on inclined planes, Applied Physics Letters, vol. 98, Issue 1, p. 014102-1-014102-3 (2011) (Year: 2011).*
Hong et al., Frequency-dependent resonance and asymmetric droplet oscillation under ac electrowetting on coplanar electrodes, J. Micromech. Microeng., vol. 22, pp. 1-9 (2012) (Year: 2012).*
Nazemi et al., Experimental Investigations on Water Droplet Oscillation and Partial Discharge Inception Voltage on Polymeric Insulating Surfaces under the Influence of AC Electric Field Stress, IEEE Transactions on Dielectrics and Electrical Insulation, vol. 20, No. 2, pp. 443-453 (2013) (Year: 2013).*
Hong et al., Size-Selective Sliding of Sessile Drops on a Slightly Inclined Plane Using Low-Frequency AC Electrowetting, Langmuir, vol. 28, Issue 15, pp. 6307-6312 (2012) (Year: 2012).*
Jiang et al., Electric field-induced oscillation of sessile droplets, Chinese Science Bulletin, vol. 56, No. 28-29, pp. 3082-3086 (2011) (Year: 2011).*
Bansal et al., Non-Axisymmetric Oscillations of Droplets in Electrowetting-on-Dielectric, 2014 IEEE 2nd International Conference on Emerging Electronics (ICEE), Bengaluru, pp. 1-4 (2014) (Year: 2014).*
Mannetje, "Electrically Assisted Drop Sliding on Inclined Planes," Applied Physics Letters, vol. 98, No. 1, 2011 (Published online Jan. 4, 2011), pp. 014102-1 to 014102-3 (5 pages total).

* cited by examiner (a)　　　　　(b)　　　　　(c)

DEVICE FOR CLEANING SURFACE USING ELECTROWETTING ELEMENT AND METHOD FOR CONTROLLING THE SAME

CROSS-REFERENCE TO RELATED APPLICATIONS

Pursuant to 35 U.S.C. § 119(a) and § 119(e), this application claims the benefit of earlier filing date and right of priority to Provisional Application No. 62/470,883 filed on Mar. 14, 2017, and Korean Patent Application No. 10-2018-0003684 filed on Jan. 11, 2018, the contents of which are hereby incorporated by reference herein in their entireties.

BACKGROUND OF THE DISCLOSURE

Field of the Disclosure

The present disclosure relates to an electrowetting element, and more particularly, to a device configured to clean the surface of an object using the electrowetting element.

Background of the Disclosure

Generally, when an electric field is applied to a liquid, particularly a liquid in the form of a droplet, placed on a solid, the contact angle and surface tension of the fluid with respect to the solid change. This behavior is defined as the electrowetting effect or phenomenon. The liquid droplet may be moved using the change of the contact angle and the contact area according to the electrowetting effect, and the direction of movement of the liquid droplet may be controlled by controlling the direction of the applied electric field. Thus, electrowetting elements configured to generate the electrowetting effect have been developed and are being employed in various fields.

More specifically, electrowetting elements have been applied to biotechnology to move, combine and divide various liquid biomaterials including blood for the purpose of experimentation and analysis. Electrowetting elements are also being applied in developing new types of displays. Such electrowetting elements have a capability of operating fine liquid droplets with a relatively simple structure, and thus may be applied to various fields other than the aforementioned fields.

SUMMARY OF THE DISCLOSURE

An object of the present disclosure is to solve the aforementioned and other problems.

More particularly, an object of the present disclosure is to provide a device configured to clean the surface of an object using the electrowetting effect.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In relation to the this object, the present disclosure may provide a device for cleaning an object surface, including a substrate provided on a surface of a predetermined object, a plurality of electrodes provided on the substrate, a dielectric layer provided on the substrate to cover the electrodes, and a control device configured to supply an alternating-current (AC) power to the electrodes, including supplying a first AC power having a predetermined first frequency and a predetermined first voltage to the electrodes during a first time period to vibrate a droplet on the surface of the object by a periodic change of an electrostatic force generated at the electrodes, wherein the first frequency is set as a resonant frequency of the liquid droplet.

The control device may be configured to detect the resonant frequency of the liquid droplet while providing a preliminary AC power to the electrodes, before supplying the first AC power to the electrodes. More specifically, while detecting the resonant frequency, the control device may be configured to sequentially sweeping a predetermined range of frequencies of the provided preliminary AC power, sense resonance of the droplet during the sweeping, and set a frequency at which the resonance occurs as the first frequency.

More specifically, the control device may be configured to gradually increase the frequency of the preliminary AC power starting from a predetermined frequency until the resonance of the droplet occurs, while sweeping the predetermined range of frequencies. For example, the control device may be configured to sweep frequencies between 10 Hz and 150 Hz.

Further, in order to sense the resonance of the droplet, the control device may be configured to acquire an image of the droplet using a sensor, and analyze the acquired image to detect abrupt intensification of vibration of the liquid droplet. When resonance of the liquid droplet is sensed at a plurality of frequencies, the control device may be configured to set a highest frequency of the frequencies as the first frequency of the AC power. For example, the first frequency may be 30 Hz or 100 Hz, and the first voltage may be in a range between 50 V and 150 V.

The control device may be configured to provide a second AC power having a second voltage greater than the first voltage to the electrodes during a second time period after providing the first AC power during the first time period. For example, the second voltage may be in a range between 150 V and 200 V.

More specifically, the controller may be configured to increase the first voltage of the first AC power having the first frequency to the second voltage to supply the second AC power. In addition, while providing the second AC power, the control device may be further configured to reduce the second voltage to a third voltage less than the second voltage, and repeat increasing the third voltage to the second voltage and reducing the second voltage to the third voltage. In addition, the first time period and the second time period may be set at a ratio of 8:2.

The control device may be further configured to detect the liquid droplet disposed on the surface of the object. More specifically, the control device may be configured to sense a change in impedance generated at the electrodes by the liquid droplet to sense the liquid droplet.

The control device may be configured to change inclination of the object to facilitate movement of the liquid droplet. In addition, the substrate, the electrodes, and the dielectric layer may be formed of a transparent material.

Further scope of applicability of the present disclosure will become apparent from the following detailed description. It should be understood, however, that the configurations in the detailed description are given by way of illustration only, since various changes and modifications within the spirit and scope of the present disclosure will be apparent to those skilled in the art.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE DISCLOSURE

Figure 1:
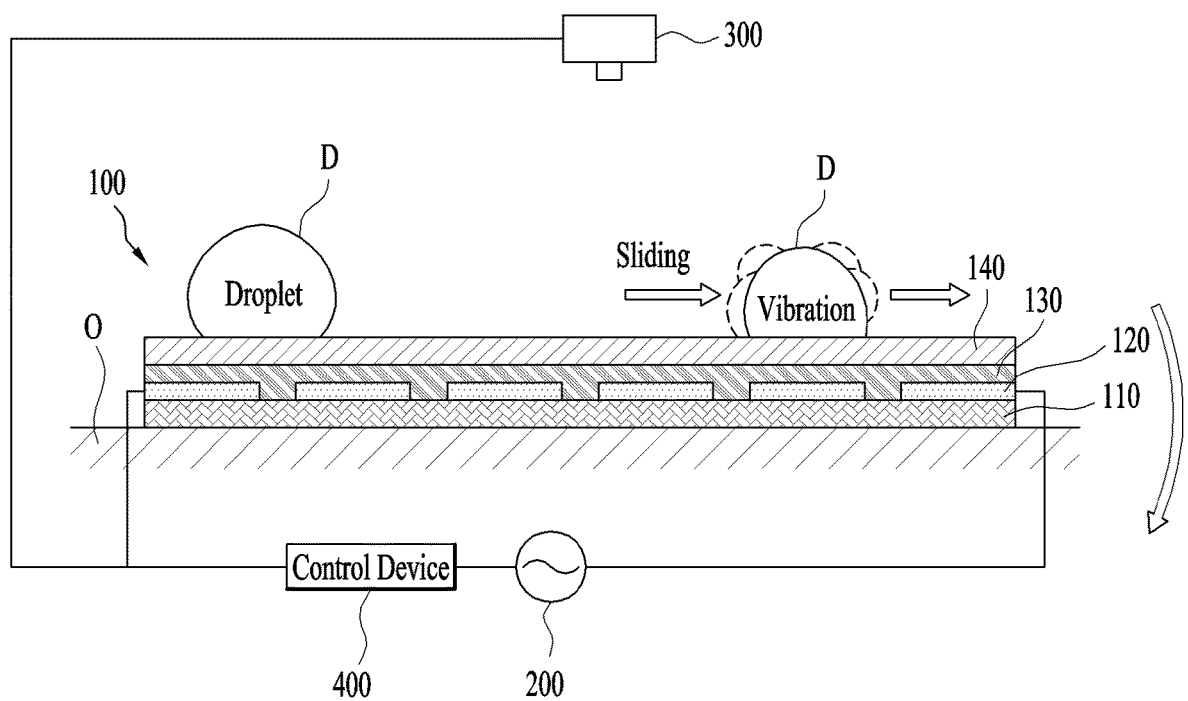
FIG. 1 is a schematic view showing a surface cleaning device using an electrowetting element according to the present disclosure.

Hereinafter, a device for cleaning a surface and a control method thereof according to the present disclosure will be described in detail with reference to the accompanying drawings.

In the following description, the same or similar elements are denoted by the same reference numerals even though they are depicted in different drawings and redundant descriptions thereof will be omitted. With respect to elements used in the following description, the suffixes "module" and "unit" are used or combined with each other only in consideration of ease in preparation of the description, and do not have distinct meanings. Accordingly, the suffixes "module" and "unit" may be interchanged with each other. In addition, in the following description, a detailed description for known functions and configurations incorporated herein will be omitted when it may make the subject matter disclosed in the present disclosure rather unclear. In addition, the accompanying drawings are provided only for a better understanding of the examples in the present disclosure and are not intended to limit the technical concept in the present disclosure. Therefore, it should be understood that the accompanying drawings include all modifications, equivalents and substitutions within the scope and sprit of the present disclosure.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise.

In the present disclosure, it will be further understood that the terms "comprises", includes," etc. specify the presence of stated features, numbers, steps, operations, elements, components, or combinations thereof, but do not preclude the presence or addition of one or more other features, numbers, steps, operations, elements, components, or combinations thereof. Further, for the same reasons, the present disclosure also covers any sub-combination excluding some features, integers, steps, operations, elements, or components from any predefined combination.

Examples of the present disclosure described below are related to a device and method for cleaning the surface of an object. However, the principle and the configuration of the described examples may be applied to any devices having different purposes or uses without change.

Figure 2:
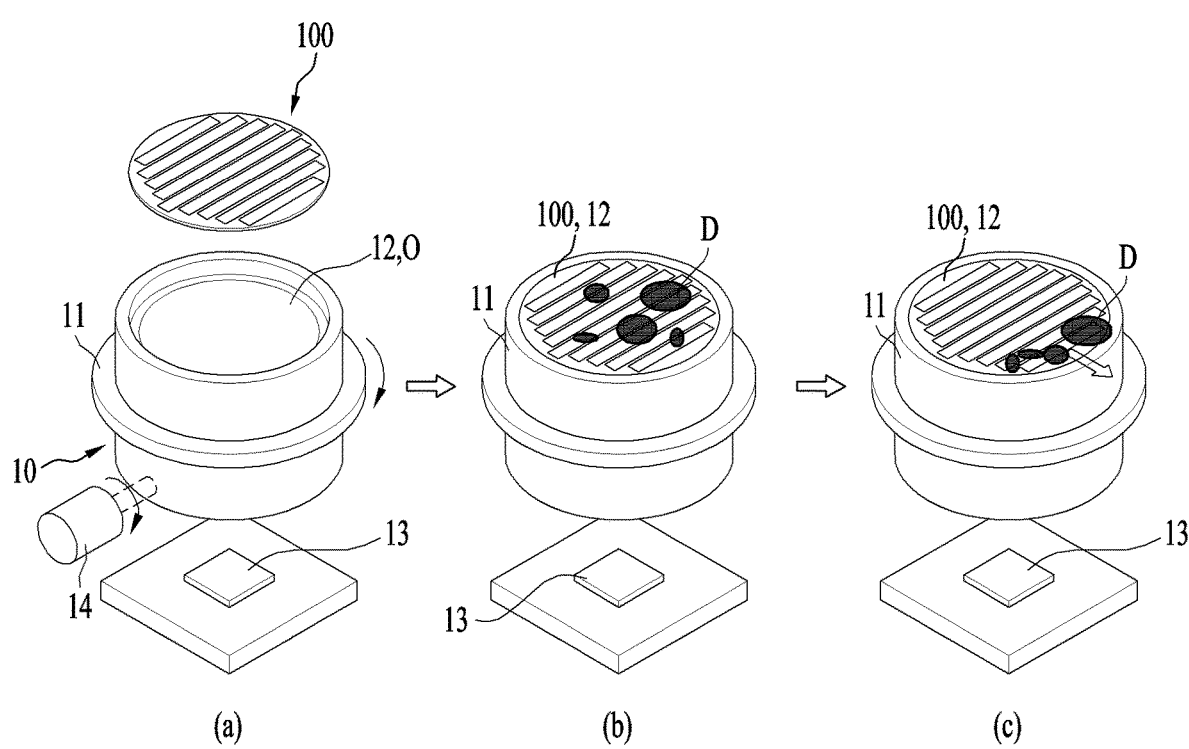
FIG. 2 is a perspective view illustrating a surface cleaning device applied to an imaging device according to the present disclosure.
Figure 3:
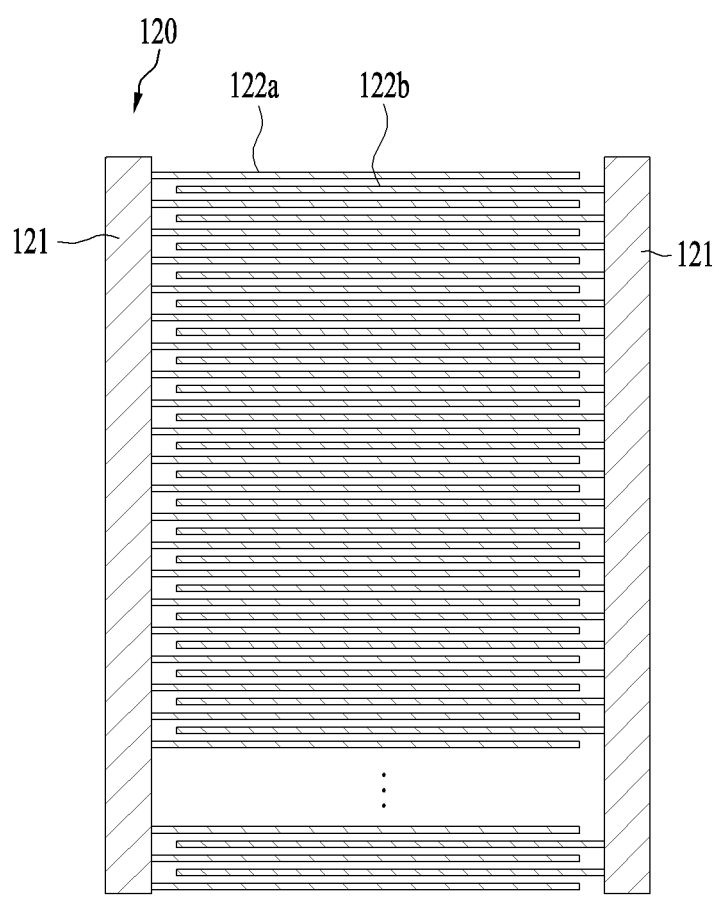
FIG. 3 is a plan view showing the structure of an electrode of a surface cleaning device according to the present disclosure.

FIG. 1 is a schematic view showing a surface cleaning device using an electrowetting element according to the present disclosure, and FIG. 2 is a perspective view illustrating a surface cleaning device applied to an image acquisition device according to the present disclosure. FIG. 3 is a plan view showing the structure of an electrode of a surface cleaning device according to the present disclosure. Hereinafter, a surface cleaning device using an electrowetting element according to the present disclosure will be described below with reference to FIGS. 1 to 3.

The surface cleaning device of the present disclosure may be configured to clean the surface of a predetermined object O by removing liquid droplets D present on the surface of the object O. The liquid droplet D on the object O may be moved on the surface of the object O so as to be removed. To move the liquid droplet D, the electrowetting effect may be applied as mentioned above. Thus, the surface cleaning device of the present disclosure may basically include an electrowetting element 100 configured to cause movement of the liquid droplet D. In FIG. 1, the cross-section of the electrowetting element 100 is shown, unlike the other components, to illustrate an internal structure thereof.

Referring to FIG. 1, the electrowetting element 100 may include a substrate 110. The substrate 110 may be disposed on the surface of the object O to be cleaned. The electrowetting element 100 may also include an electrode 120 provided on the substrate 110. More specifically, the electrode 120 may be disposed on the surface of the substrate 110. The electrode 120 may be configured to receive an electric power, a power or a voltage to form an electric field of a predetermined size. As shown in FIG. 1, a plurality of electrodes 120 may be arranged spaced apart from one another over the entire surface of the substrate 110. Thus, the electrodes 120 may form a uniform electric field over the entire surface of the electrowetting element 100 and also over the entire surface of the object O to be cleaned. The arrangement of the electrodes 120 may be achieved in a variety of ways. As an example, the pattern of FIG. 3 may be applied to the electrowetting element 100. Referring to FIG. 3, the electrodes 120 may include common electrodes 121 disposed to face each other. In addition, a plurality of sub-electrodes 122a and 122b may extend from the common electrodes 121. The sub-electrodes 122a and 122b may be alternately arranged with a predetermined spacing therebetween. Accordingly, the sub-electrodes 122a and 122b may form a uniform electric field over the entire electric wetting device 100 according to the pattern. Substantially, the electrode 120 shown in FIG. 1 and other drawings corresponds to the sub-electrodes 122a and 122b in FIG. 3. The electrode 120 may be made of various materials, for example, indium tin oxide (ITO).

The electrowetting element 100 may generate the intended electrowetting effect, i.e., movement of the liquid droplet D, with the substrate 110 and the electrode 120 alone. However, if the droplet D directly contacts the electrode 120, the liquid droplet D may be electrolyzed at a relatively high power or voltage before it is moved. For this reason, the electrowetting element 100 may include a dielectric layer 130 configured to cover the electrode 120. More specifically, the dielectric layer 130 may be disposed on the substrate 110 and the electrode 120 and be configured to cover not only the electrode 120 but also the surface of the substrate 110 exposed between the electrodes 120. That is, the electrodes 120 may be isolated from the outside by the dielectric layer 130. Therefore, due to interposition of the dielectric layer 130, the liquid droplets D may be exposed only to the electric field generated by the electrodes 120, without being electrolyzed by the electrodes 120. The dielectric layer 130 may be made of various materials, for example, silicon nitride. The electrowetting element 100 may further include a hydrophobic layer 140 provided on the dielectric layer 130. More specifically, the hydrophobic layer 140 may be disposed over the entire surface of the dielectric layer 130. The hydrophobic layer 140 may help the liquid droplet D move smoothly due to its own nature of repelling the liquid droplet D.

Figure 7:
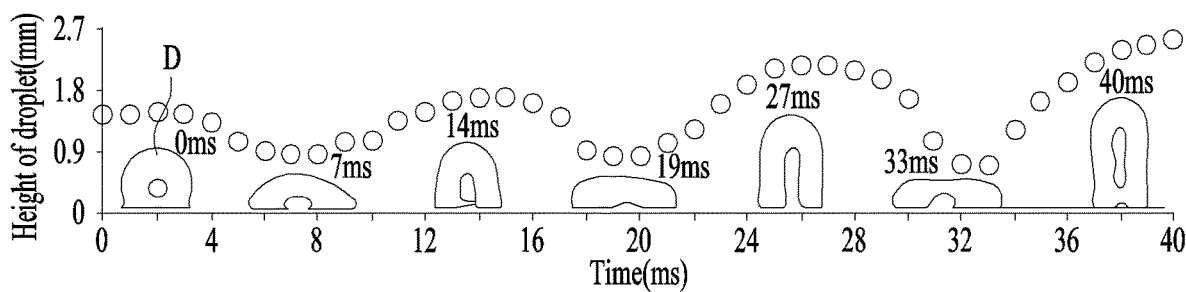
FIG. 7 is a graph depicting the behavior of a droplet when AC power is supplied to an electrowetting element.

In the electrowetting element 100, when an electric field is generated by applying a power or voltage to any one of the electrodes 120 disposed adjacent to the droplet D, the contact angle of the liquid droplet D may be changed by the electric field. More specifically, under the influence of the electric field, the liquid droplet D may be pulled toward the electrode 120, that is, the surface of the element 100, and the contact angle of the liquid droplet D with respect to the surface may be reduced. Therefore, the liquid droplet D may be moved toward such a portion where the contact angle is reduced. Using this principle, the liquid droplet D may be maneuvered to move in a desired direction by selectively applying power or voltage to a plurality of sequentially arranged electrodes 120. That is, by controlling supply of power to the electrodes 120, the movement of the liquid droplet D may be controlled. If an AC power or an AC voltage is applied to the electrodes 120, the electric field and the electrostatic force applied by the electric field are periodically alternated according to the periodically alternating frequency of the AC power. By this alternating electrostatic force, the liquid droplet D may be excited and vibrate as shown in FIG. 7, which will be described later. More specifically, the liquid droplet D may move itself out of the surfaces of the electrowetting element 100 and the object O while vibrating on the surfaces as shown in FIG. 1 with the energy obtained by excitation of the liquid droplet D, and may finally be removed from the surfaces. Such random movement of the liquid droplet D using excitation and vibration effectively removes the liquid droplet D and does not require specific control of supply of power to the electrode 120 as in maneuvering of the liquid droplet D. For the same reason, by using the excitation by the electrode 120, all the liquid droplets D present on the surface of the object O may be vibrated and moved at the same time. Since removing the liquid droplet D does not require sophisticated maneuvering of the liquid droplet D but requires only movement of the predetermined object O to the outside of the surface of the object O, the excitation and vibration of the liquid droplet D may be more efficient and effective in removing the liquid droplet D. Thus, the surface cleaning device of the present disclosure, specifically the electrowetting element 100, may be configured to generate vibration of the liquid droplet D.

More specifically, the surface cleaning device may include a power source 200 configured to supply AC power to alternate the electrostatic force for excitation of the liquid droplet D. The power source 200 is connected to the electrowetting element 100, more specifically, to the electrode 120 thereof, as shown in FIG. 1, and may apply an AC power and AC voltage to the electrode 120. Further, in order to properly control vibration of the liquid droplet D, the behavior of the liquid droplet D needs to be monitored. For example, when the AC power is supplied to the electrode 120 from the power source 200, it is necessary to check whether or not at least vibration of the liquid droplet D actually occurs. Thus, the surface cleaning device may include a sensing device 300 configured to detect the behavior of the liquid droplet D during operation of the surface cleaning device. The sensing device 300 may recognize the behavior of the liquid droplet D in various ways. For example, an ultrasonic wave, an infrared sensor, or the like may be applied to identify the state of the liquid droplet D. Among these various methods, directly acquiring the image of the liquid droplet D may be advantageous in correctly determining the behavior of the liquid droplet. For this reason, the sensing device 300 may include an imaging device configured to acquire an image of the liquid droplets D on the surface of the object O. The sensing device 300 may continuously acquire images of the liquid droplets D during operation of the surface cleaning device for precise and detailed control for removal of the liquid droplets D. The sensing device 300 may be disposed at any position where the sensing device can secure an image of the entire liquid droplets D. As an example, FIG. 1 shows a sensing device 300 disposed on top of the object O such that the entire surface of the object O to be cleaned is contained within the field of view (FOV). Further, the surface cleaning device may include a control device 400 configured to control the operations thereof. The control device 400 may include a processor and relevant electronic components and may be electrically connected to the components of the surface cleaning device, i.e., the electrowetting element 100, the power source 200 and the sensing device 300. Thus, the control device 400 may control the surface cleaning device as a whole for the intended operation. As an example, the control device 400 may control the power supply 200 to supply a required AC power or voltage to the electrowetting element 100. The control device 400 may monitor the behavior of the liquid droplet D on the surface of the object O in real time during operation of the surface cleaning device, using the sensing device 300. More specific operations of the control device 400 will be described in the control method described below.

The surface cleaning device described above may be applied to various objects O and devices to perform the cleaning operation. For example, the surface cleaning device may be applied to an imaging device, as shown in FIG. 2. The imaging device is generally configured to acquire an image using light incident through the lens. Therefore, when there is a foreign substance such as a liquid droplet D on the lens, the foreign substance may interfere with incident light, and thus an accurate image may not be obtained. In particular, when the imaging device is used outdoors, liquid droplets D that obstruct acquisition of accurate images may be attached to the surface of the lens due to various causes including climatic factors such as snow, rain, and humidity. For this reason, the surface cleaning device according to the present disclosure may be installed in the camera 10, which is an imaging device, as shown in FIG. 2.

More specifically, the camera 10 may include a lens unit, which may include a body 11 and a lens 12 installed in the body 11. The camera 10 may also include an image sensor 13 configured to acquire an image from the light incident through the lens 12. The image sensor 13 may include a charge-coupled device (CCD), for example. The surface cleaning device, more specifically, the electrowetting element 100, may be installed on the surface of the lens 12, which is an object O to be cleaned. The electrowetting element 100 may be integrated with the lens 12. That is, the electrowetting element 100 may be configured to have the same curvature as the surface of the lens 12 so as to closely contact the surface. As such, the electrowetting element 100 forms one body with the lens 12 and may be regarded as the lens 12 itself as a single module or assembly. Furthermore, the electrowetting element 100 may be implanted or embedded within the body of the lens 12, and the element 100 may be integrated with the lens 12 by such embedding. Since the electric field is not affected by the intervening medium, this embedded element 100 may still apply electrostatic force caused the electric field to the surface of the lens 12, and thus have a capability to vibrate and remove the liquid droplets D. In addition, the electrowetting element 100 applied to the lens 12 should not block incidence of light. Thus, the entire electrowetting element 100 may be configured to be transparent. More specifically, the substrate 110, the electrode 120, the dielectric layer 130, and the hydrophobic layer 140 may all be made of a transparent material. The transparent electrowetting element 100 may allow incident light to be transmitted therethrough in the same manner as the lens 12, and may remove foreign substances such as liquid droplets D. The camera 10 may include a separate cover mounted on the body 11 to protect the lens 12. This cover may be exposed to the outside of the camera 10 in place of the lens 12. In this case, the electrowetting element 100 of the surface cleaning device may be integrally attached to the lens cover. Alternatively, the lens cover itself may be configured by the electrowetting element 100.

An internal power source of the camera 10 may be used as the power source 200 of the surface cleaning device. When necessary, a separate power source 200 may be connected to the electrowetting element 100 provided in the camera 10. Similarly, the control device of the camera 10 may be connected to the electrowetting element 100 and function as the control device 400. Furthermore, since the image sensor 13 of the camera 10 acquires an image through the lens 12, an image of foreign substances on the lens 12, that is, an image of the liquid droplets D may also be acquired. Therefore, when the surface cleaning device is applied to the camera 10, the image sensor 13 may replace the sensing device 300.

In the surface cleaning device applied to the camera 10, when a droplet D, which is a foreign substance, is formed on the lens 12 including the element 100 as shown FIG. 2(b), an AC power or voltage may be supplied to the element 100 by the control device 400, and the liquid droplet D may be excited by the electrostatic force generated by the electrode 120. Subsequently, referring to FIG. 2(c), the liquid droplet D may move to the outside of the lens 12 while vibrating as indicated by an arrow. By removing the liquid droplet D in this manner, the lens 12 may be cleaned. Therefore, the camera 10 may acquire an accurate and good-quality image by cleaning the lens 12. Since the liquid droplets D may be frequently attached to the lens 12 when the camera 10 is used outdoors, the surface cleaning device is particularly effective in cleaning the lens 12 of the camera 10 which is outdoors.

As described above, the surface cleaning device has a base capability of vibrating to vibrate the liquid droplet D to clean a desired object surface, but the intended cleaning function may be maximized through more optimized control of the surface cleaning device. For this reason, a control method optimized for the surface cleaning device according to FIGS. 1 to 3 has been devised and will be described below with reference to the relevant drawings. FIGS. 1 to 3 and the description thereof are basically included and referenced in the following description of the control method and the drawings, unless indicated otherwise.

Figure 4:
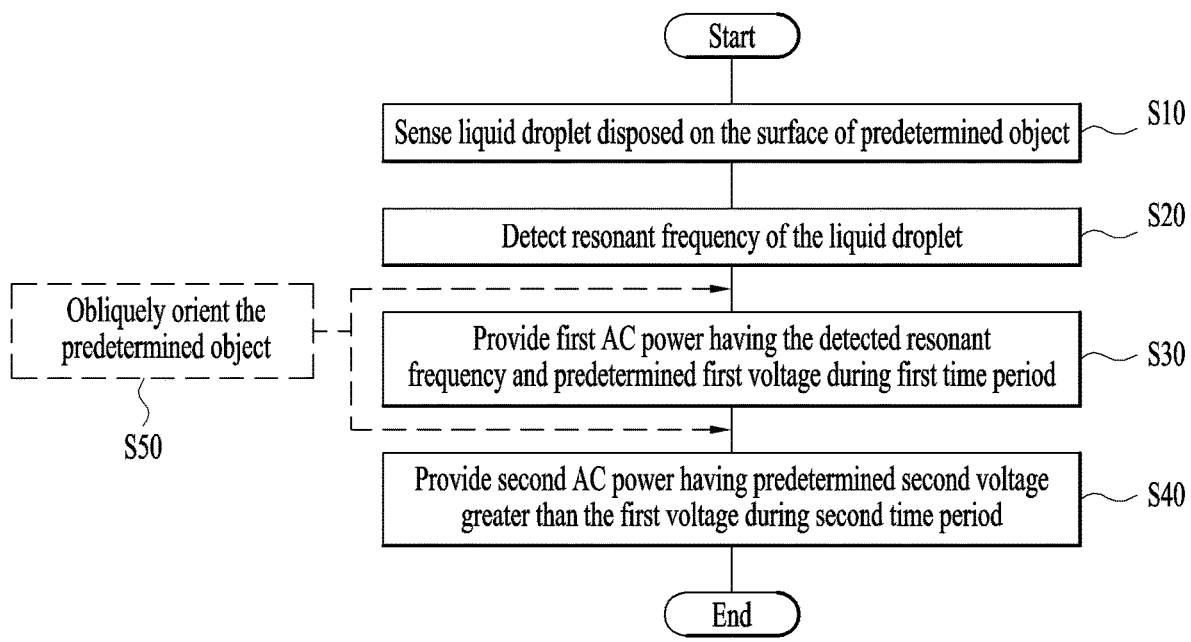
FIG. 4 is a flowchart illustrating a method of controlling a surface cleaning device using an electrowetting element according to the present disclosure.
Figure 5:
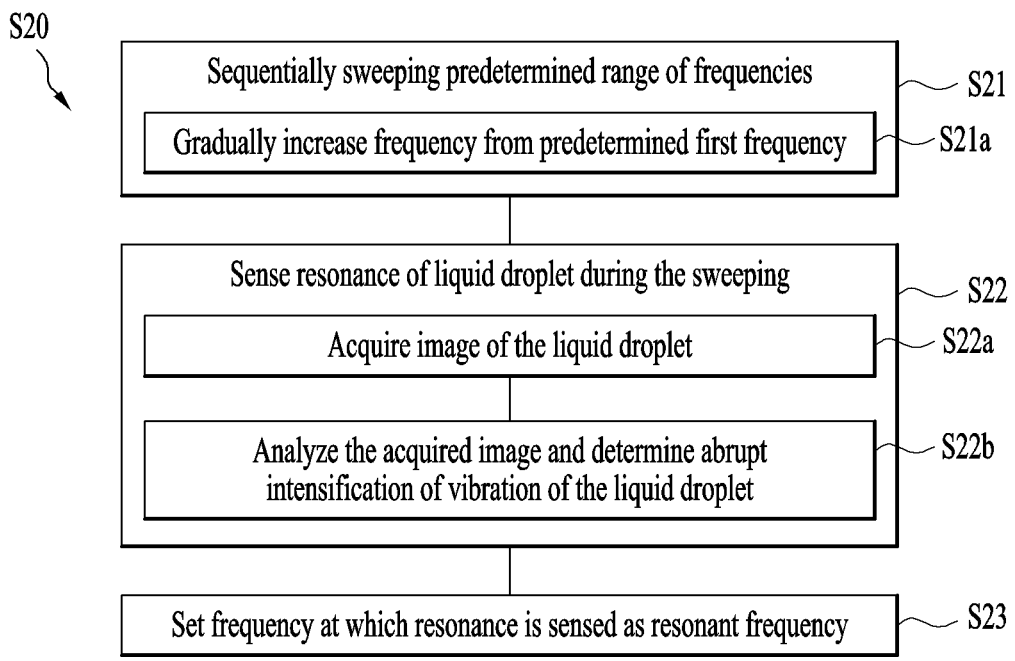
FIG. 5 is a flowchart illustrating in detail a step of detecting a resonant frequency in a control method according to the present disclosure.
Figure 6:
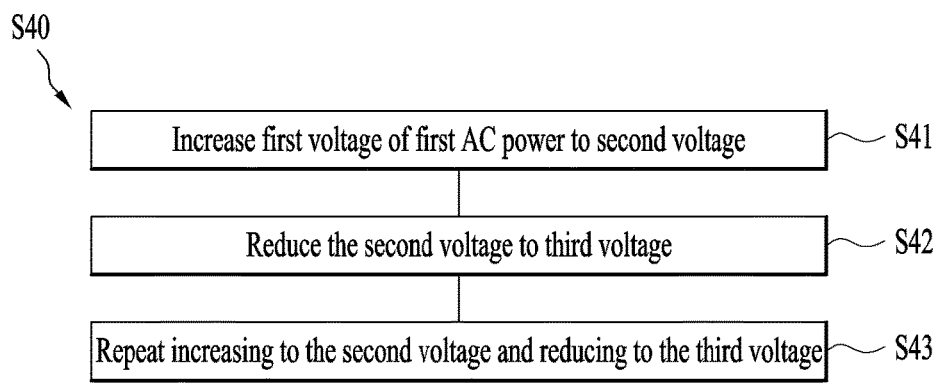
FIG. 6 is a flowchart illustrating, in detail, a step of providing a second AC power having a voltage different from that of a first AC power in the control method according to the present disclosure.
Figure 8:
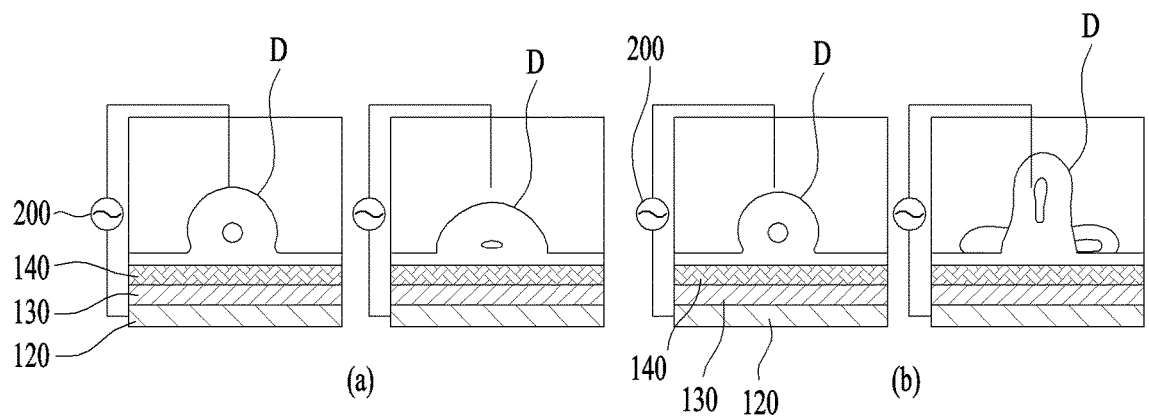
FIG. 8 is a schematic view showing the behaviors of a droplet, respectively, when AC powers having different frequencies are supplied.

FIG. 4 is a flowchart illustrating a method of controlling a surface cleaning device using an electrowetting element according to the present disclosure, FIG. 5 is a flowchart illustrating in detail a step of detecting a resonant frequency in a control method according to the present disclosure, and FIG. 6 is a flowchart illustrating in detail a step of providing a second AC power having a voltage different from that of a first AC power in the control method according to the present disclosure. FIG. 7 is a graph depicting the behavior of a droplet when AC power is supplied to an electrowetting element, and FIG. 8 is a schematic view showing the behaviors of a droplet, respectively, when AC powers having different frequencies are supplied.

The control methods described below may control the operations of the elements described above with reference to FIGS. 1 to 3, i.e., the operations of various components, and may provide intended functions based on such operations. Thus, the operations and functions associated with the control method may be considered as the features of the relevant structural components, as well as the features of the control method. In particular, the control device 400, i.e., the processor, may be referred to by various names, such as "controller" and "controlling unit", and may control all the components of the surface cleaning device to perform operations according to the control method. Thus, the control device 400 substantially controls all the methods and modes described below in the present disclosure, and therefore all the steps that will be described below may be features of the control device 400. For this reason, even though not described as being performed by the control device 400, the following steps and the detailed features thereof may all be understood as features of the control device 400. In addition, in the following description of the control method, a detailed description of the structural features and the operations thereof will be omitted. For the structural features and the operations, refer to the descriptions given with reference to FIGS. 1 to 3.

While a predetermined object O is used, it may be exposed to the external environment and foreign substances such as liquid droplets D may adhere to the surface of the object O due to various causes. Since the electrowetting element 100 of the surface cleaning device is actually disposed on the surface of the object O to be cleaned, the liquid droplets D may adhere to the electrowetting element 100. As described above, however, the electrodepositing element 100 is integrated with and functions as a part of the object O, and therefore the liquid droplets D on the surface of the electrodepositing element 100 may be regarded as liquid droplets on the surface of the object O. Further, as described above with reference to FIG. 2, the object O may substantially correspond to a predetermined device 10 or a part thereof. In this case, the surface cleaning device (hereinafter, briefly referred to as "cleaning device"), i.e., the control device 400 thereof, may first sense at least one liquid droplet D, which is a foreign substance disposed on the surface of the object O (S10). That is, the control device 400 may sense or determine whether or not the liquid droplet D exists on the surface of the object O. This sensing step S10 may be performed using various methods. For example, attachment of the liquid droplet D may be sensed in an image acquired by the sensing device 300. In addition, when the liquid droplet D is disposed on the surface of the object O, the resistance of the object O, that is, the entire surface of the electrowetting element 100, may be changed due to the resistance of the liquid droplet D. The change in resistance may result in change in impedance of the electrowetting element 100, more specifically, the electrode 120. Accordingly, when a change in impedance is sensed, the control device 400 may sense and determine that the liquid droplet D has adhered to the surface of the object O. Such sensing of the liquid droplet D based on the impedance may be performed using only the basic configuration of the electrowetting element 100 without an additional device. Therefore, the cleaning device may be simplified, and the liquid droplet D may be accurately sensed.

As described above, when an AC power or AC voltage is applied to the electrodes 120, electrostatic force, which periodically alternates due to the periodic alternation of the frequency, may be exerted on the liquid droplet D. The electrostatic force may excite the liquid droplet D, and the liquid droplet D may start to vibrate due to the excitation. In addition, as shown in FIG. 7, the degree of vibration of the liquid droplet D (the height of the deformed liquid droplet D in the drawing) gradually increases over time, and sufficient vibration to move the liquid droplet D may be generated. Particularly, if AC power is applied to the electrodes 120 at a frequency capable of resonating the liquid droplet D (hereinafter referred to as "resonant frequency"), the mechanical energy obtained by the liquid droplet D may be maximized due to the generated resonance, and maximum vibration and movement of the liquid droplet D may occur. Therefore, the liquid droplet D may move to the outside of the surface of the object O more quickly at the resonant frequency. For this reason, in order to more efficiently and effectively remove the liquid droplet D, the control method of the present disclosure may be configured to provide an AC power having a resonant frequency.

In order to supply the AC power, the control device 400 may be configured to detect the resonant frequency of the liquid droplet D first (S20). That is, immediately upon sensing the liquid droplet D in the sensing step S10, the control device 400 may perform a series of steps for detecting the resonant frequency of the attached liquid droplet D. In the detection step S20, the resonant frequency may be specified using various methods. However, the attached liquid droplet D may actually have various sizes, and thus the resonant frequency may be slightly changed according to various factors including the size of the liquid droplet D. Therefore, in order to accurately specify the resonant frequency, the resonant frequency needs to be detected every time the liquid droplet D is sensed. For this reason, during the detection step S20, the control device 400 may be configured to search for the resonant frequency in real time while continuously supplying AC power to the electrowetting element 100.

Referring to FIG. 5, to perform the search in the detection step S20, the control device 400 may sequentially sweep a predetermined range of frequencies while supplying AC power to the element 100 (S21). That is, in the detection step S20, the control device 400 may supply an AC power having one different frequency to the electrode 120 of the element 100 at a time in order to find the resonant frequency. In other words, the control device 400 may change the frequency of the AC power stepwise while supplying the AC power of a certain voltage. More specifically, in the sweeping step S21, the control device 400 may gradually increase the frequency of the supplied AC power starting from a predetermined frequency (S21*a*). This increasing step S21*a* may be continuously performed until the liquid droplet D resonates. Resonance of the liquid droplet D may occur at multiple frequencies. Therefore, even if resonance of the liquid droplet D occurs and is detected, the frequency of the AC power may be continuously increased to detect additional resonant frequencies. It is inefficient to sweep the whole frequency band, and therefore a frequency range to be swept needs to be limited. Among many factors, the vibration behavior of the liquid droplet D at frequencies may be considered to limit the frequency range. First, as shown in FIG. 8(*b*), at a relatively low frequency, the liquid droplet D may be greatly deformed while vibrating in a low cycle. However, large deformation may be disadvantageous for smooth movement of the liquid droplet D since it increases the contact area and friction between the liquid droplet D and the surface of the object O as shown in the figure. On the other hand, referring to FIG. 8(*a*), at a relatively high frequency, the liquid droplet may vibrate in a high cycle without being greatly deformed. Accordingly, the contact area between the liquid droplet D and the surface of the object O may be relatively narrowed, and the frictional force may also be relatively lessened due to the narrowed contact area. Given reduced friction, alternation in a high cycle may facilitate start of movement of the liquid droplet D from an initial position. Therefore, vibration and resonance at a relatively high frequency may be advantageous for smooth movement and removal of the liquid droplet D. For this reason, the frequency range to be swept may be set to start from a relatively low frequency but to include relatively high frequencies. For example, the frequency range may be set between 10 Hz and 150 Hz. In this case, in the increasing step S21*a*, the control device 400 may gradually increase the frequency of the supplied AC power from a predetermined frequency of 10 Hz to a relatively high frequency of 150 Hz.

Referring back to FIG. 5, during the sweeping step S22, the control device 400 may sense resonance of the liquid droplet D that occurs at a specific frequency (S22). In the sensing step S22, the control device 400 may sense the resonance of the droplet using the sensing device 300, and various methods may be applied to this operation. For example, an ultrasonic wave, an infrared sensor, or the like may be used. Among these methods, a sensing device 300 configured with an imaging device may be used to correctly determine the state of the liquid droplet D, and thus the resonance of the liquid droplet D may be sensed through an image acquired by the sensing device 300. More specifically, as shown in FIG. 5, in the sensing step S22, the control device 400 may continuously acquire images of the liquid droplet D using the sensor, namely, the sensing device 300 while sweeping of the frequencies is performed (S22*a*). As described above with reference to FIG. 2, when the cleaning device is applied to the camera 10, an image sensor 13 embedded in the camera 10 may be used to acquire an image of the liquid droplet D. If resonance occurs in the liquid droplet D, vibration of the liquid droplet D may be abruptly intensified, which may be clearly confirmed through the image. Accordingly, the control device 400 may analyze the acquired image and determine abrupt intensification of the vibration of the liquid droplet D based on the analyzed image (S22*b*). Thus, when such abrupt intensification of vibration is determined or sensed, the control device 400 may sense occurrence of resonance of the liquid droplet D.

When abrupt intensification of vibration, that is, resonance is sensed in the sensing step S22, the control device 400 may set the frequency of the supplied AC power as a resonant frequency (S23). In addition, the control device 400 may set the frequency at which the resonance is sensed in the sensing step S22 to a frequency of the AC power to be supplied to the electrowetting element 100 in the future. In most cases, abrupt intensification of vibration occurs in a plurality of liquid droplets D on the surface of the object O, and therefore sensing of the resonance and setting of the resonant frequency may be performed relatively easily. Nevertheless, to implement more consistent and objective sensing of resonance and setting of the resonant frequency, the control device 400 may sense or determine that resonance has occurred when it is determined that abrupt intensification of vibration occurs in at least one of the liquid droplets D on the surface of the object O. For the same reason, the control device may set the frequency at this time as a resonant frequency.

As mentioned above, the resonant frequency of the droplets D may vary slightly due to various factors. However, in most cases, the size of the attached liquid droplets D is substantially limited to a range of approximately 2-3 μm. Therefore, resonance of the liquid droplet D occurs at approximately 30 Hz. Resonance of the liquid droplet D additionally occurs at a higher frequency of 100 Hz. Accordingly, in the setting step S23, the control device 400 may set 30 Hz and 100 Hz as first and second resonant frequencies, respectively, and set one of the first and second resonant frequencies as a frequency of the AC power to be supplied to the electrowetting element 100. Further, as discussed above in relation to FIG. 8, the liquid droplet D may be moved more smoothly and quickly by vibration and resonance at a relatively high frequency. Therefore, if a plurality of resonant frequencies is detected in the detection step S20 (S21-S23), the control device 400 may select a higher frequency as an actually detected resonant frequency. That is, the control device 400 may set the highest frequency among the plurality of resonant frequencies as the frequency of the AC power to be supplied. For example, the control device 400 may set the second resonant frequency of 100 Hz, which is higher than the first resonant frequency of 30 Hz, as the frequency of the AC power to be supplied, in order to effectively remove the liquid droplet D.

Referring back to FIG. 4, as discussed above, a single resonant frequency may be sensed, or one of a plurality of sensed resonant frequencies is selected in the detection step S20. Thereby, one specific resonant frequency may be set in order to supply the AC power. In this case, the control device 400 may provide or supply a first AC power having the set resonant frequency, i.e., the first frequency, to the electrowetting element 100 to vibrate and remove the liquid droplet D (S30). In the supply step S30, the supplied first AC power may have a predetermined first voltage. The first voltage may be appropriately set depending on the characteristics of the first AC power or the voltage required by the device in which the cleaning device is installed, and may have a range of 50 V to 150 V, for example. In addition, for the same reason, the AC power may constantly have the first voltage during the detection step S20 described above. The first AC power may be provided to the electrowetting element 100 during a predetermined first time period. The first time period may be set appropriately so as to sufficiently move and remove the liquid droplet D. More specifically, the control device 400 may check the state of the liquid droplet D on the surface of the object O using the sensing device 300, and may control the first AC power to be persistently supplied until the liquid droplet D is sufficiently removed from the surface.

Figure 9:
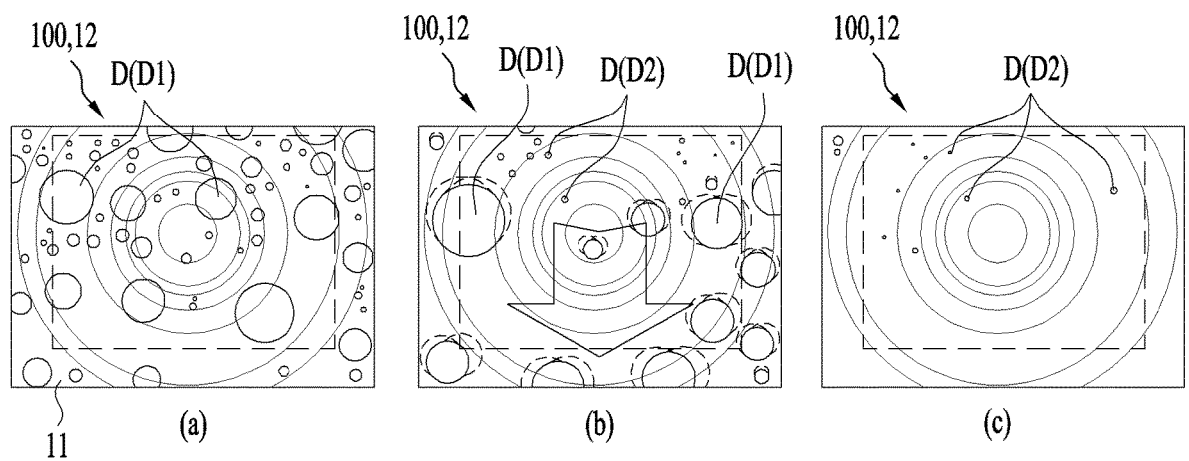
FIG. 9 is a plan view illustrating droplets removed by the control method according to the present disclosure.

By supplying the AC power having the detected resonant frequency during the supply step S30, the droplets D may be removed from the surface of the object O with great vibration. The series of operations discussed above is clearly shown in FIG. 9. FIG. 9 is a plan view illustrating droplets removed by the control method according to the present disclosure. FIG. 9 shows an example of the operation of the cleaning device applied to the camera 10 according to FIG. 2. Referring to FIG. 9(*a*), during use of the camera 10, a plurality of liquid droplets D may adhere to the surface of the lens 12 as foreign substances. In this case, through the sensing step S10, the cleaning device, that is, the control device 400, may sense presence of the liquid droplets D. Subsequently, the control device 400 may sense the resonant frequency by performing the detection step S20 and supply the first AC power having the detected resonant frequency to the electrowetting device 100. As shown in FIG. 9(*b*), resonance of the liquid droplets D on the surface of the lens 12 may be caused by the first AC power, and the liquid droplets D may be excited by the maximum energy. As shown FIG. 9(*b*), the liquid droplets D may quickly move out of the surface of the lens 12, as indicated by the arrow, by the energy obtained while greatly vibrating by the resonance. Further, since the liquid droplets D vibrate greatly due to the generated resonance, the liquid droplets D adjacent to each other may be bonded to each other to form a liquid droplet D of an increased size. Further, the liquid droplet D of the increased size may increase the size thereof by absorbing other liquid droplets D as it moves. The larger droplet D generated by the resonance may vibrate more greatly due to the increased size and mass thereof, and thus may move more quickly and smoothly out of the surface of the lens 12, namely, the predetermined object O. Therefore, supplying the AC power having a resonant frequency may not only amplify the vibration of the liquid droplet D, but also facilitate movement of the liquid droplet D as described above. As a result, the liquid droplet D may be removed from the surface by moving to the outside of the surface of the lens 12, that is, the object O. Thereby, the surface may be cleaned.

Figure 10:
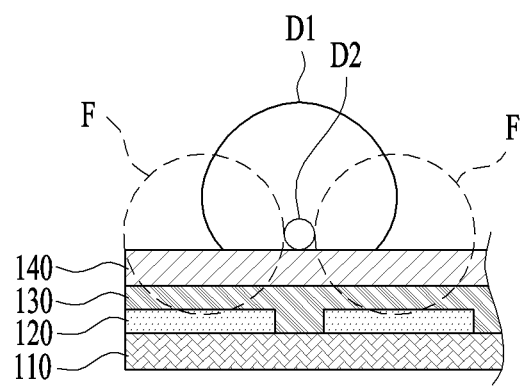
FIG. 10 is a schematic view illustrating a correlation between the range of an electric field and the size of a droplet that can be excited.

As shown in FIG. 9(*c*), most liquid droplets D1 are moved and removed by supply of the first AC power, but relatively small or fine liquid droplets D2 (hereinafter referred to as "fine liquid droplets") may remain on the surface of the object O, that is, the lens 12. This phenomenon may be explained by the limitation of the size of the liquid droplet D, which may be influenced by the electric field generated at the electrodes 120. In this regard, FIG. 10 is a schematic view illustrating a correlation between the range of an electric field and the size of a droplet that can be excited. As shown in FIG. 10, the adjacent electrodes 120 are spaced apart from each other by a predetermined distance. Since the intensity or range of the electric field depends on the voltage supplied to the electrodes 120, the electric field F generated at a constant first voltage of the first AC power may also have a certain range. Therefore, a certain region where the electric field F is not formed may exist between the electrodes 120 spaced apart from each other. For this reason, the liquid droplet D1 of a relatively large size may be included and excited in the generated adjacent electric fields F, while the fine liquid droplets D2 cannot be excited at they are disposed outside the electric fields F. Therefore, the fine liquid droplets D2 may not be appropriately vibrated and may remain on the surface of the object O (i.e., the lens 12), as shown in FIG. 9(*c*). If the range of the electric field F is widened, the fine liquid droplets D2 may also be included and excited within the widened range of the electric field F. As already discussed, the range (or size) of the electric field F is proportional to the supplied voltage. Accordingly, in order to widen the range of the electric field F, the control device 400 may provide or supply a second AC power having a second voltage higher than the first voltage to the electrowetting element 100 after the supply step S30 (S40).

Figure 11:
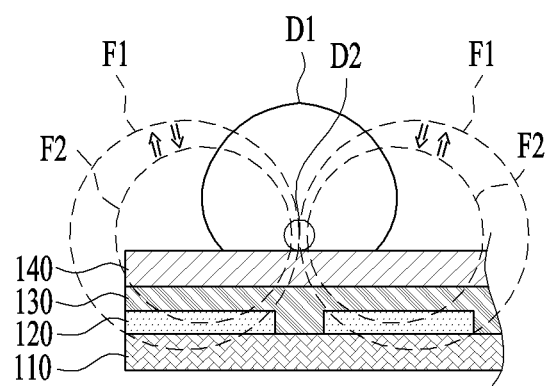
FIG. 11 is a schematic view illustrating a fine liquid droplet excited by an electric field expanded due to an increased voltage.

More specifically, it may be advantageous for the supply step S40 to be performed without interruption following the supply step S30 in order to efficiently remove the liquid droplets D. To ensure this continuity, in the supply step S40, the control device 400 may increase only the voltage of the first AC power that is substantially currently being supplied from the first voltage to the second voltage as shown in FIG. 6 (S41). However, the control device 400 may be described as substantially providing a second AC power different from the first AC power due to the change to the second voltage. In addition, only the voltage may be changed to expand the electric field F and the second AC power supplied for continued excitation may have a second frequency, that is, a resonant frequency equal to the first frequency of the first AC power. In addition, the second frequency (i.e., the resonant frequency) of the second AC power supplied may be continuously maintained throughout the supply step S40. The second voltage may be appropriately set to be greater than at least the first voltage, and may be in a range of, for example, 150 V to 200 V. The electric field F may be expanded by supplying the second AC power (i.e., the second voltage), and the relationship between the expanded electric field and the fine liquid droplets D2 is well shown in FIG. 11. Referring to FIG. 11, the supplied second voltage allows the electrodes 120 to form an electric field F1 larger than the electric field F generated by the first voltage. The fine liquid droplets D2 may be included in the expanded electric field F1 and may be sufficiently excited and vibrated to be removed.

Further, to more effectively excite the fine liquid droplet D2, the control device 400 may reduce the second voltage of the second AC power to a third voltage during the supply step S40 (S42). That is, the control device 400 may supply a second AC power having the third voltage lower than the second voltage to the electrowetting element 100. As shown in FIG. 11, by supplying the second AC power having the third voltage, an electric field F2 that is narrower rather than the electric field F1 formed at the second voltage may be formed. However, even in this case, the electric field F2 at the third voltage must be formed so as to include at least the fine liquid droplets D2 in order to continuously apply effective excitation. Therefore, in order to form the electric field F2, the third voltage may be set to be smaller than the second voltage but larger than at least the first voltage. Subsequently, the control device 400 may increase the third voltage of the second AC power to the second voltage and reduce the second voltage back to the third voltage. Such increase and decrease of the voltage may be repeated (S43). That is, the control device 400 may repeatedly perform supply of the second AC power having the second voltage and supply of the second AC power having the third voltage. Even if the fine liquid droplets D2 are included in the electric fields F1 and F2, it may not be easy to sufficiently excite the fine liquid droplets D2 due to the small size and mass of the fine liquid droplets D2. However, as shown in FIG. 11, by alternately supplying the second and third voltages, which are different from each other, the electric fields F1 and F2 in different ranges may be alternately applied to the fine liquid droplets D2. Thus, an additional excitation force may be exerted on the fine liquid droplets D2. Therefore, the fine liquid droplet D2 may be appropriately vibrated, and the surface of the object O may be completely cleaned as the fine liquid droplets D2 are removed.

In the supply step S40 described above, the second AC power having various voltages may be provided to the electrowetting element 100 during a predetermined second time period, wherein the second time period may be appropriately set such that the fine liquid droplets D2 may be sufficiently moved and removed. More specifically, the control device 400 may monitor the surface of the object O using the sensing device 300, and maintain supply of the second AC power until even the fine liquid droplets D2 are completely removed from the surface. In addition, as already discussed above, the supply step S30 is configured to remove most of the liquid droplets D1, but the supply step S40 may be configured to remove only the remaining fine liquid droplets D2. Thus, the first time period during which the supply step S30 is performed may be set to be longer than the second time period during which the supply step S40 is performed. For example, the first time period and the second time period may be set to a ratio of 8:2.

When the object O is oriented obliquely, the liquid droplet D on the object O (i.e., the electrowetting element 100) is subjected to gravitational force and is thus more easily moved by this additionally applied force. Thus, referring back to FIG. 4, the control device 400 may obliquely orient the object O and the electrowetting element 100 installed thereon (S50). For example, as shown in FIG. 2, the camera 10 may include a predetermined driving device 14. The control device 400 may use the driving device 14 to generate a displacement of the camera 10 and to orient the object O to be cleaned, i.e., the lens 12 and the electrowetting element 100 so as to be inclined. More specifically, the driving device 14 may include a device capable of generating a rotational force, and may use the generated rotational force, which is indicated by an arrow in FIG. 1, to rotate at least the lens 12 and the device 100 so as to be obliquely oriented. While the driving device 14 is illustrated as being coupled to the lens body 11 by way of example, it may be coupled to other parts of the camera 10 and may include any device capable of generating driving force for changing orientation of the lens 12 and the electrowetting element 100, which are objects to be cleaned. The orienting step S50 may be performed before or after the supply steps S40 and S50 and may be performed at any time during the supply steps S40, S50. Due to the orienting step S50, the liquid droplets D may be more smoothly moved along the slope due to gravity while vibrating, and may be removed from the surface of the object O more easily.

The effects of the surface cleaning device and the control method according to the present disclosure are described below.

The surface cleaning device and control method of the present disclosure may generate resonance in the liquid droplets on the surface of an object by controlling the frequency of the supplied AC power. That is, the surface cleaning device and the control method may be configured to detect a resonant frequency and supply the AC power having the detected resonant frequency. Therefore, the liquid droplets may be removed as they are quickly and smoothly moved out of the surface of the object while being resonated.

In addition, the surface cleaning device and control method of the present disclosure may excite even fine liquid droplets on the surface of the object by additionally controlling the voltage of the supplied AC power. That is, the surface cleaning device and the control method may increase the voltage of the supplied AC power to widen the range of electrodes so as to excite even the fine liquid droplets. Therefore, even the fine liquid droplets may be appropriately excited and vibrated, thereby being removed from surface of the object.

Accordingly, the surface cleaning device and the control method according to the present disclosure may effectively vibrate and quickly and efficiently remove all the droplets on the surface of an object by optimally controlling the frequency and voltage of the supplied AC power.

It will be appreciated by those skilled in the art that the effects that can be achieved through the embodiments of the present disclosure are not limited to those described above and other effects of the present disclosure may be apparent to those skilled in the art from the claims.

Although a number of representative examples are described above, it should be understood that numerous other modifications of these examples that fall within the spirit and scope of the principles of this disclosure can be devised by those skilled in the art. More particularly, various variations and modifications are possible within the scope of the disclosure, the drawings and the appended claims. In addition to variations and modifications, alternative uses will also be apparent to those skilled in the art.

What is claimed is:

1. A device for cleaning a surface of an object, comprising:
    a substrate configured to be provided on the surface of the object;
    electrodes provided on the substrate;
    a dielectric layer provided on the substrate to cover the electrodes; and
    a control device programmed to:
        supply an alternating-current (AC) power to the electrodes via a power source,
        detect a resonant frequency of a liquid droplet on the surface of the object while providing a preliminary AC power to the electrodes, before supplying a first AC power to the electrodes,
    supply the first AC power having a first frequency and a first voltage to the electrodes during a first time period to vibrate the liquid droplet on the surface of the object by a periodic change of an electrostatic force generated at the electrodes, wherein the first frequency is set as the resonant frequency of the liquid droplet, and
    supply a second AC power having a second voltage greater than the first voltage to the electrodes during a second time period after providing the first AC power during the first time period, to cause a second electric field at the second voltage to be greater than a first electric field at the first voltage such that a portion of the surface of the object covered by the second electric field is increased,
    wherein the control device is further programmed to perform the supply of the second AC power immediately after the supply of the first AC power is finished,
    wherein the second AC power has a second frequency which is equal to the resonant frequency at the first voltage, and
    wherein the control device is further programmed to:
        reduce the second voltage to a third voltage which is greater than the first voltage and less than the second voltage, to cause a third electric field at the third voltage to be greater than the first electric field at the first voltage,
        increase the third voltage to the second voltage, and
        alternately repeat increasing the third voltage to the second voltage and reducing the second voltage to the third voltage, to exert an additional excitation force on the liquid droplet by alternately applying the second and third electric fields with different ranges and intensities to the liquid droplet thereby cleaning the surface of the object.

2. The device according to claim 1, wherein the control device is further programmed to, when detecting the resonant frequency of the liquid droplet:
    sequentially sweep a predetermined range of frequencies while providing the preliminary AC power,
    sense resonance of the liquid droplet, and
    set a frequency at which the resonance occurs as the first frequency.

3. The device according to claim 2, wherein the control device is further programmed to, when sequentially sweeping the predetermined range of frequencies, gradually increase a frequency of the preliminary AC power starting from a predetermined frequency until the resonance of the liquid droplet occurs.

4. The device according to claim 3, wherein the control device is further programmed to sweep frequencies between 10 Hz and 150 Hz.

5. The device according to claim 2, further comprising an image sensor,
    wherein the control device is further programmed to, in order to sense the resonance of the liquid droplet:
        acquire an image of the liquid droplet using the image sensor, and
        analyze the acquired image to detect abrupt intensification of vibration of the liquid droplet.

6. The device according to claim 1, wherein the control device is further programmed to set a highest frequency of resonant frequencies as the first frequency of the first AC power.

7. The device according to claim 1, wherein the first voltage is in a range between 50 V and 150 V.

8. The device according to claim 1, wherein the second voltage is in a range between 150 V and 200 V.

9. The device according to claim 1, wherein the control device is further programmed to increase the first voltage of the first AC power having the first frequency to the second voltage to supply the second AC power.

10. The device according to claim 1, wherein the first time period and the second time period are set at a ratio of 8:2.

11. The device according to claim 1, wherein the control device is further programmed to detect the liquid droplet disposed on the surface of the object by sensing a change in impedance generated at the electrodes by the liquid droplet.

12. The device according to claim 1, wherein the control device is further programmed to change inclination of the object to facilitate movement of the liquid droplet.

13. The device according to claim 1, wherein the substrate, the electrodes, and the dielectric layer are formed of a transparent material.

14. The device according to claim 1, wherein the control device is further programmed to maintain the first frequency of the first AC power to be constant, while providing the first AC power having the first voltage during the first time period.

15. The device according to claim 1, wherein the control device is further programmed to continuously maintain the second frequency of the second AC power to be equal to the resonant frequency at the first voltage, while providing the second AC power having the second voltage during the second time period.

16. A method for cleaning a surface of an object, comprising:
    providing a device, including:
        a substrate;
        electrodes provided on the substrate;
        a dielectric layer provided on the substrate to cover the electrodes; and
        a control device;
    arranging the substrate on the surface of the object;
    supplying, by the control device, an alternating-current (AC) power to the electrodes via a power source;
    detecting, by the control device, a resonant frequency of a liquid droplet on the surface of the object while providing a preliminary AC power to the electrodes, before supplying a first AC power to the electrodes;
    supplying, by the control device, the first AC power having a first frequency and a first voltage to the electrodes during a first time period to vibrate the liquid droplet on the surface of the object by a periodic change of an electrostatic force generated at the electrodes, wherein the first frequency is set as the resonant frequency of the liquid droplet;
    supplying, by the control device, a second AC power having a second voltage greater than the first voltage to the electrodes during a second time period after providing the first AC power during the first time period, to cause a second electric field at the second voltage to be greater than a first electric field at the first voltage such that a portion of the surface of the object covered by the second electric field is increased,
    wherein the supplying of the second AC power is performed immediately after the supplying of the first AC power is finished, and
    wherein the second AC power has a second frequency which is equal to the resonant frequency at the first voltage;
    reducing, by the control device, the second voltage to a third voltage which is greater than the first voltage and less than the second voltage, to cause a third electric field at the third voltage to be greater than the first electric field at the first voltage;
    increasing, by the control device, the third voltage to the second voltage; and
    alternately repeating, by the control device, increasing the third voltage to the second voltage and reducing the second voltage to the third voltage, to exert an additional excitation force on the liquid droplet by alternately applying the second and third electric fields with different ranges and intensities to the liquid droplet thereby cleaning the surface of the object.

* * * * *